(12) United States Patent
Walvoord et al.

(10) Patent No.: US 10,977,765 B2
(45) Date of Patent: Apr. 13, 2021

(54) HIERARCHICAL NEURAL NETWORK IMAGE REGISTRATION

(71) Applicant: Eagle Technology, LLC, Melbourne, FL (US)

(72) Inventors: Derek J. Walvoord, Rochester, NY (US); Doug W. Couwenhoven, Rochester, NY (US)

(73) Assignee: Eagle Technology, LLC, Melbourne, FL (US)

( * ) Notice: Subject to any disclaimer, the term of this patent is extended or adjusted under 35 U.S.C. 154(b) by 96 days.

(21) Appl. No.: 16/380,690

(22) Filed: Apr. 10, 2019

(65) Prior Publication Data
US 2020/0327639 A1   Oct. 15, 2020

(51) Int. Cl.
*G06T 3/00* (2006.01)
*G06N 3/08* (2006.01)
*G06N 3/04* (2006.01)

(52) U.S. Cl.
CPC ......... *G06T 3/0068* (2013.01); *G06N 3/0454* (2013.01); *G06N 3/08* (2013.01)

(58) Field of Classification Search
CPC .... G06N 3/0454; G06N 3/0445; G06N 3/049; G06N 3/04
USPC .......................................... 358/293–298, 151
See application file for complete search history.

(56) References Cited

U.S. PATENT DOCUMENTS 9,984,312 B2   5/2018 Kim et al.
2017/0308734 A1* 10/2017 Chalom .............. G06K 9/6267
2018/0260663 A1   9/2018 Kim et al.
2019/0156106 A1*  5/2019 Schroff .............. G06K 9/00677
2020/0013154 A1*  1/2020 Jang .......................... G06T 7/97
2020/0051206 A1*  2/2020 Munkberg ............ G06T 3/0093

FOREIGN PATENT DOCUMENTS

CN         108510532 A      9/2018

OTHER PUBLICATIONS

Caballero, J., et al., "Real-Time Video Super-Resolution with Spatio-Temporal Networks and Motion Compensation," arXiv:1611.05250v2, 2017 [Online].
Fischer, P., et al., "FlowNet: Learning Optical Flow with Convolutional Networks," arXiv:1504.06852v2, 2015 [Online].

* cited by examiner

*Primary Examiner* — Nirav G Patel
*Assistant Examiner* — Stephen M Brinich
(74) *Attorney, Agent, or Firm* — Edell, Shapiro & Finnan, LLC

(57) ABSTRACT

One or more neural networks generate a first vector field from an input image and a reference image. The first vector field is applied to the input image to generate a first warped image. The training of the neural networks is evaluated via one or more objective functions. The neural networks are updated in response to the evaluating. The neural networks generate a second vector field from the input image and the reference image. A number of degrees of freedom in the first vector field is less than a number of degrees of freedom in the second vector field. The second vector field is applied to the input image to generate a second warped image. The neural networks are evaluated via the one or more objective functions, the reference image and the second warped image. The networks are updated in response to the evaluating.

20 Claims, 8 Drawing Sheets

700

```
┌─────────────────────────────────────────────────────────────────────┐  705
│ GENERATING, VIA ONE OR MORE NEURAL NETWORKS FROM A REFERENCE IMAGE  │
│ AND FIRST IMAGE DATA OF AN INPUT IMAGE, A FIRST VECTOR FIELD        │
└─────────────────────────────────────────────────────────────────────┘
                                    ↓
┌─────────────────────────────────────────────────────────────────────┐  710
│ APPLYING THE FIRST VECTOR FIELD TO SECOND IMAGE DATA OF THE INPUT   │
│ IMAGE TO GENERATE A FIRST WARPED IMAGE OF THE INPUT IMAGE           │
└─────────────────────────────────────────────────────────────────────┘
                                    ↓
┌─────────────────────────────────────────────────────────────────────┐  715
│ EVALUATING THE TRAINING OF THE ONE OR MORE NEURAL NETWORKS VIA AN   │
│ OBJECTIVE FUNCTION, THE REFERENCE IMAGE AND THE FIRST WARPED IMAGE  │
└─────────────────────────────────────────────────────────────────────┘
                                    ↓
┌─────────────────────────────────────────────────────────────────────┐  720
│ UPDATING THE ONE OR MORE NEURAL NETWORKS IN RESPONSE TO THE         │
│ EVALUATING VIA THE OBJECTIVE FUNCTION, THE REFERENCE IMAGE AND      │
│ THE FIRST WARPED IMAGE                                              │
└─────────────────────────────────────────────────────────────────────┘
                                    ↓
┌─────────────────────────────────────────────────────────────────────┐  725
│ GENERATING, VIA THE ONE OR MORE NEURAL NETWORKS FROM THE REFERENCE  │
│ IMAGE AND THIRD IMAGE DATA OF THE INPUT IMAGE, A SECOND VECTOR      │
│ FIELD, WHEREIN A NUMBER OF DEGREES OF FREEDOM IN THE FIRST VECTOR   │
│ FIELD IS LESS THAN A NUMBER OF DEGREES OF FREEDOM IN THE SECOND     │
│ VECTOR FIELD                                                        │
└─────────────────────────────────────────────────────────────────────┘
                                    ↓
┌─────────────────────────────────────────────────────────────────────┐  730
│ APPLYING THE SECOND VECTOR FIELD TO FOURTH IMAGE DATE OF THE INPUT  │
│ IMAGE TO GENERATE A SECOND WARPED IMAGE                             │
└─────────────────────────────────────────────────────────────────────┘
                                    ↓
┌─────────────────────────────────────────────────────────────────────┐  735
│ EVALUATING THE TRAINING OF THE ONE OR MORE NEURAL NETWORKS VIA THE  │
│ OBJECTIVE FUNCTION, THE REFERENCE IMAGE AND THE SECOND WARPED IMAGE │
└─────────────────────────────────────────────────────────────────────┘
                                    ↓
┌─────────────────────────────────────────────────────────────────────┐  740
│ UPDATING THE ONE OR MORE NEURAL NETWORKS IN RESPONSE TO THE         │
│ EVALUATING VIA THE OBJECTIVE FUNCTION, THE REFERENCE IMAGE AND      │
│ THE SECOND WARPED IMAGE                                             │
└─────────────────────────────────────────────────────────────────────┘
```

FIG.7

HIERARCHICAL NEURAL NETWORK IMAGE REGISTRATION

TECHNICAL FIELD

The present disclosure relates to the registration of image data.

BACKGROUND

Image registration has evolved into a necessary and expected preprocessing step in nearly all applications that aim to extract information and actionable intelligence from image-derived data sets. Algorithms designed to operate on a single image are becoming increasingly rare. Instead, the scientific community is often inundated with a surplus of imagery that has been captured with variable geometry, modality, and collection time. Global alignment of these images becomes critical in developing exploitation tools that rely on spatial consistency, such as change detection, depth estimation, and object tracking.

Current image registration approaches typically employ an analytical model that defines the alignment, as well as metadata defining the collection geometry, e.g., position and orientation from an inertial measurement system (INS), image feature correspondences, or some combination to the two. Neither sensor-based nor feature-based approaches are without limitation. In the event that a photogrammetric sensor model exists, poor model assumptions and errors in parameter measurements may yield significant misalignment in the registration process. Whether applied independently or after coarse geometry correction, image feature matching approaches often suffer from poor localization, sensitivity to image texture, computationally intensive outlier removal methods, and other challenges. Moreover, feature correspondences must be filtered such that they exist only on the stabilization surface for which the model parameters are valid. In other words, perfect feature correspondences will still produce registration errors if the model fails to accurately represent the image-to-image relationship.

BRIEF DESCRIPTION OF THE DRAWINGS

FIG. 7 illustrates a flow chart of a method for providing the image registration techniques of the present disclosure, according to example embodiments.

DESCRIPTION OF EXAMPLE EMBODIMENTS

Overview

One or more neural networks generate a first vector field from a reference image and first image data of an input image. The first vector field is applied to second image data of the input image to generate a first warped image of the input image. The training of the one or more neural networks is evaluated via one or more objective functions, the reference image and the first warped image. The one or more neural networks are updated in response to the evaluating via the one or more objective functions, the reference image and the first warped image. The one or more neural networks generate a second vector field from the reference image and third image data of the input image. A number of degrees of freedom in the first vector field is less than a number of degrees of freedom in the second vector field. The second vector field is applied to fourth image data of the input image to generate a second warped image of the input image. The one or more neural networks are evaluated via the one or more objective functions, the reference image and the second warped image. The one or more neural networks are updated in response to the evaluating via the one or more objective functions, the reference image and the second warped image.

Example Embodiments

Figure 1:
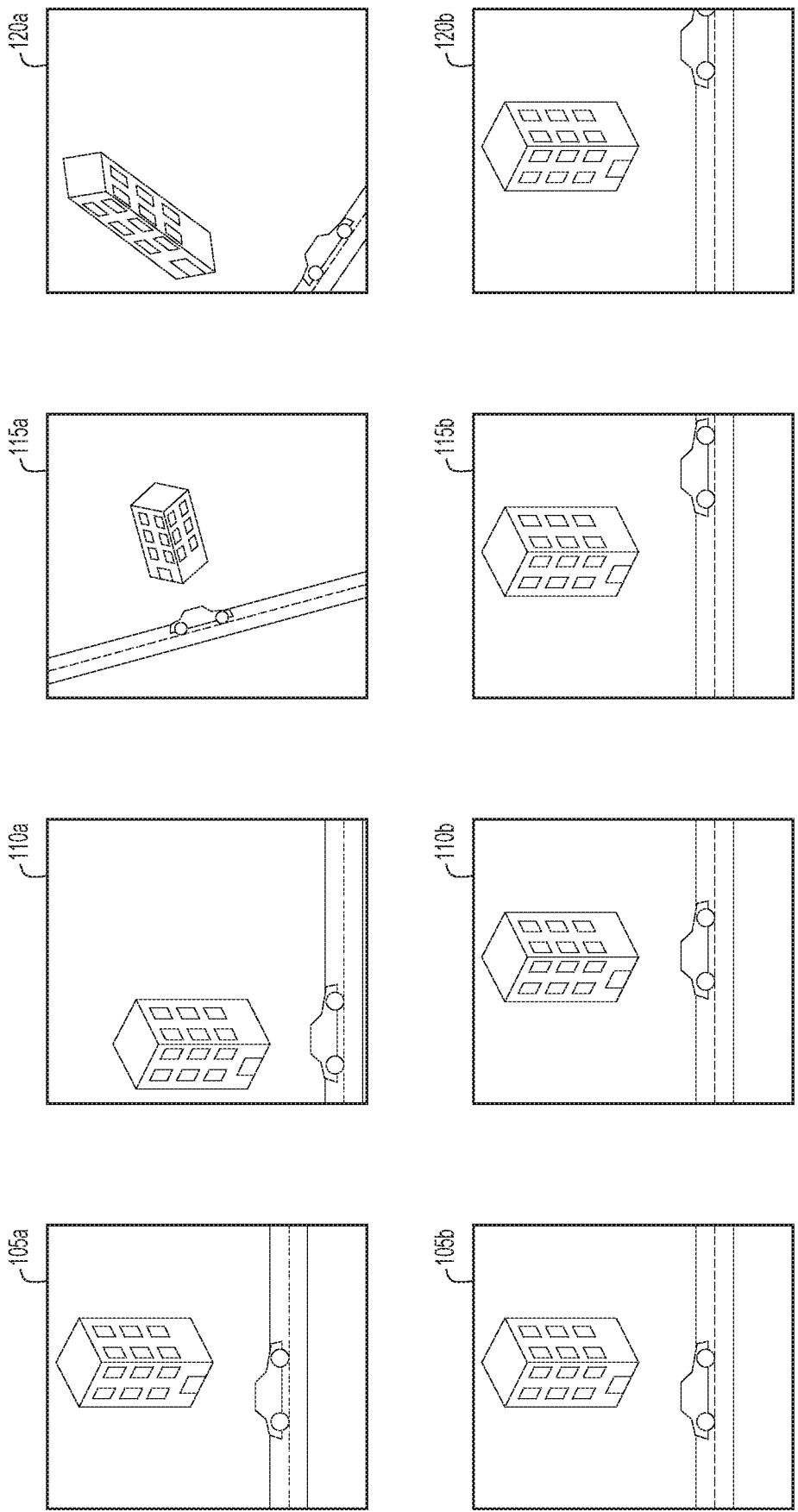
FIG. 1 is an illustration of image registration techniques, according to example embodiments.

With reference made to FIG. 1, depicted therein are a series of unregistered images 105a-120a and corresponding registered images 105b-120b presented to assist in the understanding of the techniques disclosed herein. Contained in each of the images is similar content (e.g., a vehicle whose position is changing and a building whose position remains fixed). As the images progress from image 105a-120a, the images undergo transformation with an increasing number of degrees of freedom. For example, the framing of image 110a has undergone a two-dimensional translation compared to image 105a. Image 115a undergoes a transformation of at least four degrees of freedom, a two dimensional translation, a rotation and a change of scale. Image 120a undergoes a transformation of even a larger number of degrees of freedom. Such transformations may include translation, rotation, change of scale, change of perspective, atmospheric effects such as refraction, lens distortion, and others. Images 105b-120b show the effects of a registration process applied to these images. As shown, the images have been processed to essentially eliminate the transformations between images 105a-120a. This registration allows for the extraction of information, such as actionable intelligence from image derived data sets. Using FIG. 1, as an example, the registration of images 105a-120a as illustrated in images 105b-120b allows the extraction of information regarding the vehicle illustrated in registered images 105b-120b. Specifically, the path of the vehicle may be more easily tracked in registered images 105b-120b. The registration of images also has applications in fields including, but not limited to, medical imaging, band-to-band registration, change detection, object tracking, motion detection, image fusion, dense feature 3D reconstruction, remote sensing, computer vision, astrophotography, and image mosaicing, among others.

Related art techniques for image registration may be based upon sensor geometry information and/or feature detection and may rely on registration model assumptions that may end up being incorrect. For example, knowing the location and orientation of a sensor, such as a camera, at the time image data is acquired may permit for a coarse registration of the acquired image data. For example, knowing sensor telemetry and/or sensor elevation data relative to the imaged scene, the content within the image data may be coarsely registered. Other related art techniques use image feature detection methods to register images. For example, salient feature detection, description, and matching may be used to provide a series of condition equations for parameter estimation of an assumed warping model, which may then be applied to image data to register images. Still other related art techniques combine these techniques, providing coarse registration using sensor data, and adjusting the coarse registration using feature detection.

More recent related art techniques have employed neural networks, such as convolutional neural networks (CNNs), for deformable image warping. According to such techniques, a single CNN is used, which generates a vector field for each image to be registered. After training, the CNN will generate a single vector field for each respective image based upon a reference image and the image being registered. Each image is then warped based upon its respective vector field to generate a series of registered images. Because a single vector field is utilized in these techniques, the registered images may exhibit unwanted higher order distortions. Due to the use of a single vector field that is unconstrained in the number of degrees of freedom of the transformation, transformations may be applied on a per-pixel basis. Such techniques may introduce local distortions into the registered images. For example, using a single unconstrained vector field may introduced distortions, such as melding or warping of stationary features, such as cars or smaller buildings, into the background of the image.

Example embodiments of the techniques of the present disclosure may improve upon all of these techniques. The techniques of the present disclosure do not rely upon sensor geometry data or feature detection. Furthermore, the techniques of the present disclosure may provide greater accuracy and flexibility than the CNN registration techniques that rely on a single vector field to warp respective images to be registered. As will be described in greater detail below, the techniques of the present disclosure train one or more neural networks, such as CNNs, to generate two or more vector fields used to register a group of images. Each of the vector fields is generated with a different number of degrees of freedom. Accordingly, each image is warped according to two or more vector fields during the registration process, where the applied vector fields have different numbers of degrees of freedom. Said differently, the techniques of the present disclosure register images through a hierarchical motion model recovery between image pairs. Through the use of the hierarchical vector fields (e.g., vectors fields with increasing degrees of freedom), the unwanted higher order distortions exhibited in related art techniques may be eliminated.

Figure 2:
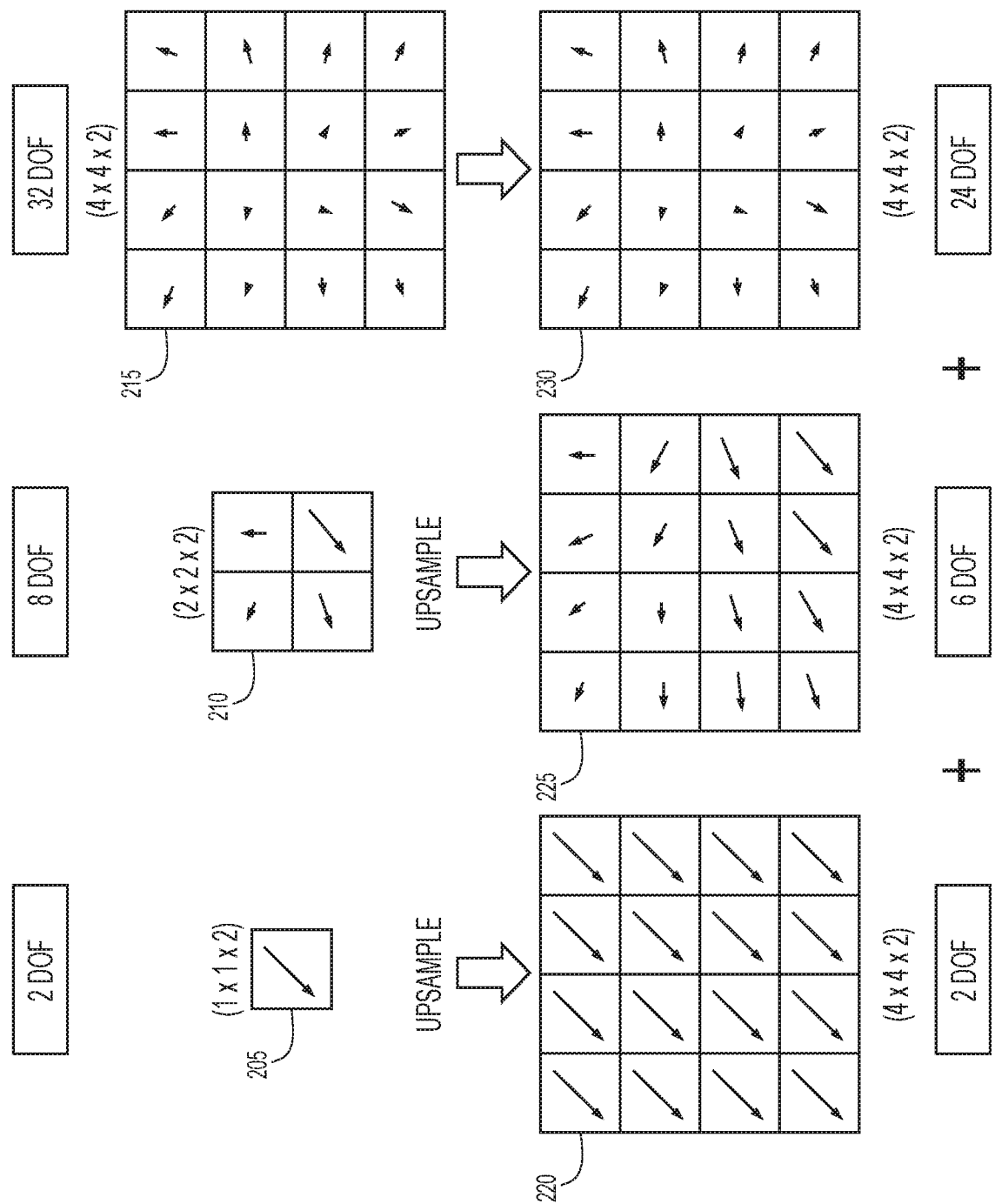
FIG. 2 is an illustration of hierarchical vector fields used to implement the image registration techniques of the present disclosure, according to example embodiments.

With reference now made to FIG. 2, depicted therein is a hierarchical series of vector fields according to an example embodiment of the present disclosure. Specifically, illustrated in FIG. 2, are three vector fields 205, 210 and 215. According to the techniques of the present disclosure, each of vector fields 205, 210 and 215 will be generated using respective CNNs, as will be described below with reference to FIG. 3-5. As also illustrated in FIG. 2, each of vector fields 205, 210 and 215 has a different number of degrees of freedom. As used herein, "degrees freedom" refers to the number of parameters required to represent the vector field. For example, vector field 205 is represented by a single vector having a horizontal (x) and vertical (y) component, resulting in two degrees of freedom (x and y). Vector field 210 is represented by four vectors, each of which possess two degrees of freedom, making the total degrees of freedom eight for vector field 210. Vector field 215 is represented by 16 vectors, each of which possesses two degrees of freedom, making the total degrees of freedom thirty two for vector field 215.

For each of the vector fields, a number of degrees of freedom is selected for the generation of the vector field. A CNN may then be trained to generate a vector field with the designated number of degrees of freedom. For example, vector field 205 is generated from a CNN that generates a vector field with two degrees of freedom. Such a vector field may accommodate for a two-dimensional translation between images.

Vector field 210 is generated from a CNN that generates a vector field with eight degrees of freedom, two degrees of freedom in each element of the 2×2 vector field. This vector field is able to accommodate all of the transformation represented by vector field 205, plus an additional six parameters for describing more complicated motion. Through the use of these additional six degrees for freedom, the vector field may accommodate effects such as translation, rotation, scale, affine transformation and perspective transformation.

Vector field 215 is generated from a CNN that generates a vector field with 32 degrees of freedom (i.e., two degrees of freedom in each element of the 4×4 vector field). Through such a vector field, lens distortion, slowly varying ground elevation and other transformations may be accommodated for without introducing the high level distortion introduced with a single, high resolution vector field.

As also illustrated in FIG. 2, the vector fields illustrated therein are coarse vector fields, meaning that they are generated in a form that is not at the same resolution as the images being registered. Accordingly, as shown in FIG. 2, the coarse vector fields 205, 210 and 215 are upsampled to generate upsampled vector fields 220, 225 and 230, respectively. The upsampling may be performed using a variety of image resampling techniques such as bilinear, bicubic, and others that will be known to one skilled in the art.

According to the specific example of vector field 205, vector field 205 is generated such that it performs a 2 degree of freedom translation of image data. More specifically, vector field 205 is a 1×1×2 single vector that provides two degrees of freedom containing a horizontal $x_0$ and vertical $y_0$ displacement. Upsampling this coarse vector field to the size of the input image yields a result in which each pixel is equally translated. Accordingly, this vector field applies a translation-only warp, $$x_{out} = f_2(CVF_0, x_{in}) = \begin{bmatrix} 1 & 0 & x_0 \\ 0 & 1 & y_0 \\ 0 & 0 & 1 \end{bmatrix} x_{in},$$

where $x_{in}$ and $x_{out}$ denote input and output pixel locations in homogeneous coordinates, $CVF_0$ refers to coarse vector field 205, and $f_2$ is a function providing the two degree of freedom warp defined by vector field 205.

According to the specific example of vector field 210, this vector field is configured to provide a full perspective warp of image data, $$x_{out} = f_8(CVF_1, x_{in}) = \begin{bmatrix} a_{11} & a_{12} & x_0 \\ a_{21} & a_{22} & y_0 \\ v_1 & v_2 & 1 \end{bmatrix} x_{in},$$

where $a_{11}$, $a_{12}$, $a_{21}$ and $a_{22}$ are affine warp coefficients, the $v_1$ and $v_2$ coefficients provide perspective distortion, and $f_8$ is a function providing the eight degree of freedom warp defined by vector field 210. Moving up in the hierarchy, the degrees of freedom for subsequent vector fields may be chosen such that the degrees of freedom increase exponentially:

$$x_{out} = f_{32}(CVF_2, x_{in})$$
$$x_{out} = f_{128}(CVF_3, x_{in})$$
$$\vdots$$
$$x_{out} = f_{2^{2s+1}}(CVF_K, x_{in}).$$

Through vector fields likes those illustrated in FIG. 2, vectors may be generated that warp images for registration that may meet one or more of the following criterial:

The vector fields may exhibit smoothly varying magnitude and orientation both spatially (and temporally)

Figure 3:
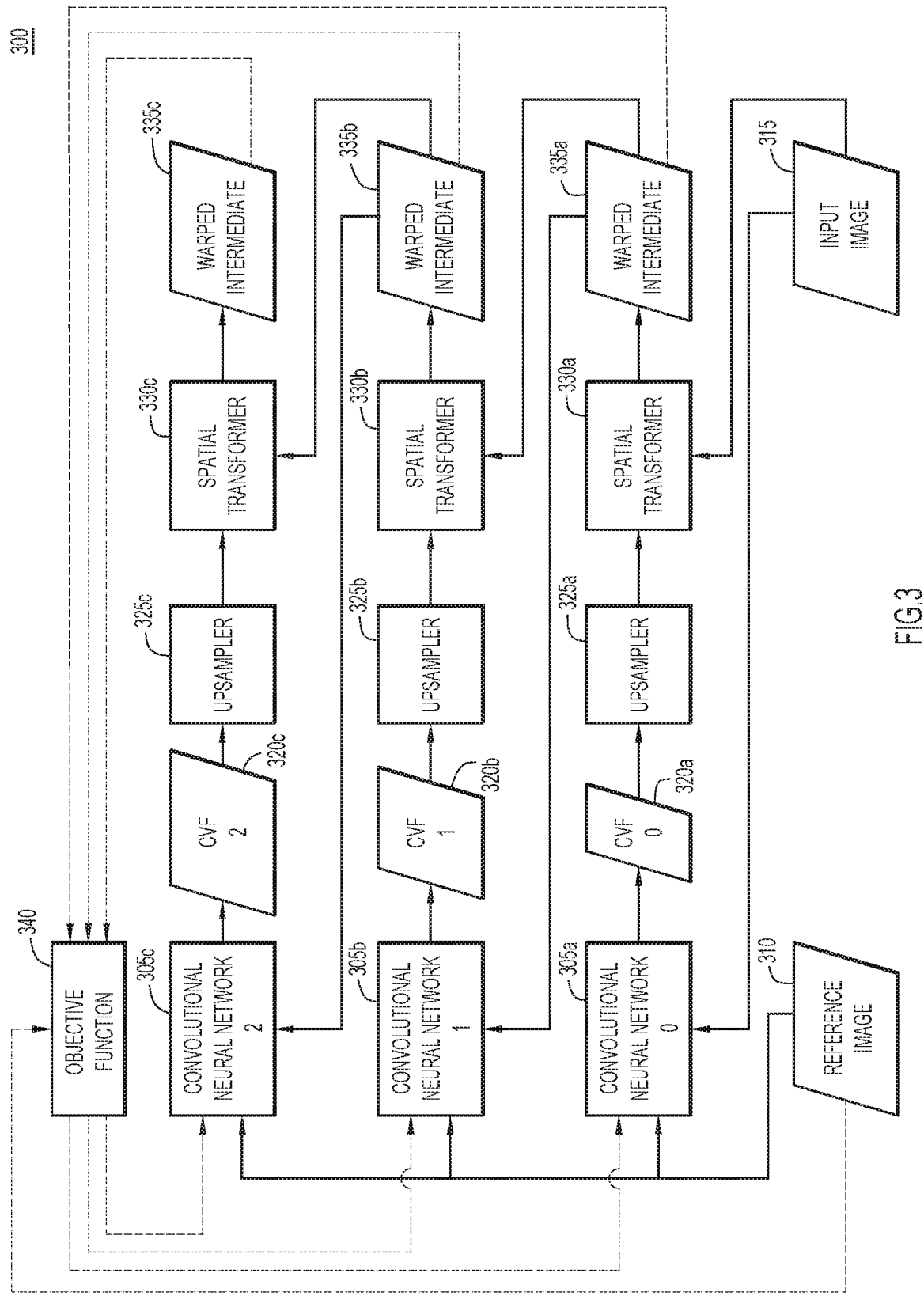
FIG. 3 illustrates a first process flow for training and using neural networks according to the image registration techniques of the present disclosure, according to example embodiments.

The vector fields may generalize for changes in geometry across small and large time differences The vector fields may accommodate spatially flat regions in the input and reference images Small spatial differences, such as moving vehicles, may be ignored Larger spatial differences due to parallax maybe optionally ignored With reference now made to FIG. 3, depicted therein is a process 300 for training two or more CNNs to implement the techniques of the present application. According to other example embodiments, a single CNN may be used to produce the vector fields generated by the two or more CNNs described with reference to FIGS. 3-5, as well as the registration processing described with reference to FIGS. 3-6. Accordingly, separate CNNs will be used in the description of the embodiments for clarity, but equivalent results may be obtained using a single CNN that produces the multiple vector fields shown. Similarly, FIG. 3 is illustrated and described below with reference to three upsamplers 325*a-c* and three spatial transformers 335*a-c*. Other example embodiments may separate or combine the processing provided by these elements into more or fewer upsamplers and/or spatial transformers, respectively.

According to the example of FIG. 3, CNNs 305*a-c* are trained to register images according to the hierarchical method of the present disclosure. According to one specific example embodiment, each of CNNs 305*a-c* may include alternating convolutional and average pooling layers that extract features and reduce the spatial dimension while increasing a feature dimension to 16, where 16 represents the number of filters used in each convolutional layer. The skilled artisan will understand the use of convolutional and pooling layers to extract features from images, and will recognize that the number of filters used in each convolutional layer may be more or less than 16, and that different image sequences may benefit from using more or less filters, depending on the complexity of the motion present in the input images.

Reference image 310 and one or more input images 315 are provided to CNNs 305*a*. The reference image may be a first frame of full motion video, while the other input images are subsequent video frames. Alternatively, any frame from the input images may be selected as the reference image, such as the center frame of the full motion video sequence, and the other images in the sequence will be registered to it in accordance with the techniques of the present disclosure. Other examples of input images 315 include frames of magnetic resonance imaging data, and CT imaging data, among others. CNN 305*a* generates coarse vector field 320*a*, which is then upsampled by upsampler 325*a* to generate an upsampled vector field. The upsampled vector field is then applied to image data associated with the input image 315 through spatial transformer 330*a* to produce warped image 335*a*. Collectively, CNN 305*a*, coarse vector field 320*a*, upsampler 325*a*, spatial transformer 330*a*, and warped image 335*a* are referred to as a "layer", and the present invention provides for a hierarchical architecture containing two or more layers.

The next layer of the architecture begins with CNN 305*b*, which receives reference image 310 and image data associated with input image 315. According to the example embodiment of FIG. 3, the image data associated with input image 315 is warped image 335*a*. Though, as will be described with reference to FIGS. 4 and 5 below, the image data may also be the unwarped input image. Reference image 310 and warped images 335*a* serve as input to CNN 305*b*, which generates coarse vector field 320*b*. Coarse vector field 320*b* has more degrees of freedom than coarse vector field 320*a*, and is therefore able to represent more complex motion. In this arrangement, because CNN 305*b* receives the warped image 335*a* instead of the input image 315, CNN 305*b* only needs to learn the image transformations that CNN 305*a* could not. In a similar manner to the first layer, coarse vector field 320*b* is upsampled by upsampler 325*b* and supplied to spatial transformer 330*b*, which now receives warped image 335*a* and applies the upsampled vector field to produce warped image 335*b*.

The architecture shown in FIG. 3 has a third layer containing a CNN 305*c*, coarse vector field 320*c*, upsampler 325*c*, spatial transformer 330*c*, and warped image 335*c*. Similar to the previous layer, this layer uses the warped image 335*b* produced by the previous layer as input to CNN 305*c* and spatial transformer 330*c*. Coarse vector field 320*c* contains more degrees of freedom than the coarse vector field 320*b* used in the previous layer, and therefore is capable of describing even more complicated motion. Using the warped image 335*b* from the previous layer as input to CNN 305*c* encourages the network to learn only the motion aspects that the previous layer was incapable of. Any number of additional layers may be added to the network architecture, as appropriate to describe the type of motion present in the input image sequence.

The warped images 335*a-c* and the reference image 310 are provided to objective function 340, which evaluates the how effectively the warped images 335*a-c* are registered to the reference image 310. Objective function 340 may use a standard similarity metric in comparing warped images 335*a-c* with the reference image 310. According to specific example embodiments, minimizing a pixel-wise sum of absolute differences (SAD) may provide smoother learning curves and better overall registration results than correlation-based metrics, but one skilled in the art will recognize that other objective functions may be used in accordance with other example embodiments, including correlation based objective functions.

Additionally, objective function 340 is illustrated as evaluating each of CNNs 305a-c. According to other example embodiments, more or fewer objective functions may be used to evaluate CNNs 305a-c. For example, a separate objective function may be used to evaluate each of CNNs 305a-c, respectively.

As illustrated in FIG. 3, the output of the objective function 340 is provided to each of CNNs 305a-c, which update their respective neural networks to improve the quality of the vectors fields they generate. The process flow 300 will then be repeated a number of times for the same or different input images 315 until the objective function 340 determines that the registration provided by the vector fields 320a-c is sufficiently accurate.

As noted above, process flow of FIG. 3 is carried out in accordance with the techniques of the present application because CNNs 305a-c are being trained to generate two or more vector fields that will be used to register images, and the two or more vector fields are generated with different numbers of degrees of freedom. For example, coarse vector field 320a may be generated with two degrees of freedom, like vector field 205 of FIG. 2, coarse vector field 320b may be generated with 8 degrees of freedom, like vector field 210 of FIG. 2, and coarse vector field 320c may be generated with 32 degrees of freedom, like vector field 215, also of FIG. 2. It is this use of multiple vectors fields (i.e., two or more vector fields), in which the number of degrees of freedom of the warping provided by the vector fields is different, that is implemented in example embodiments of the present disclosure. Other details of the process may change, as will be shown through the additional example embodiments described in more detail below. For example, a single neural network may be trained to produce multiple vector fields with different numbers of degrees of freedom. Similarly, the manner in which the two or more vector fields are applied to the images may be altered without deviating from the techniques of the present disclosure, as illustrated in FIGS. 4 and 5 below.

The elements of FIG. 3 (e.g., CNNs 305a-c, spatial transformers 330a-c, and other optional elements) may form a spatial transformation network. The parameters of such a network, such as the number of CNNs 305a-c, the number of degrees of freedom permitted for one or more of vector fields 320a-c, and other parameters, may be set by a user of the system. These parameters may be tailored based on any number of considerations, including the specific application for the image data, the specific image set, the type of motion present in the image set, the modality used to acquire the image data, the combination of modalities in the image data, whether the image data represent full motion video or individual images captured over elapsed periods of time, and others.

In process flow 300 of FIG. 3, the input image 315 is input to spatial transformer 330a for warping provided by the upsampled vector field generated from coarse vector field 320a. Warped images 335a are then provided to spatial transformer 330b as the input to which the upsampled vector field derived from coarse vector field 320b will be applied. Warped images 335b then serve as the input to spatial transformer 330c for application of the upsampled vector field derived from coarse vector field 320b. Accordingly, in the example of FIG. 3, the input images 315 serves as the input to the first of the hierarchy of vector fields and CNNs, with warped images serving as the input for the subsequent vector fields and CNNs of the hierarchy. FIGS. 4 and 5 illustrate different process flows for training neural networks for image registration according to the hierarchical techniques of the present disclosure.

Figure 4:
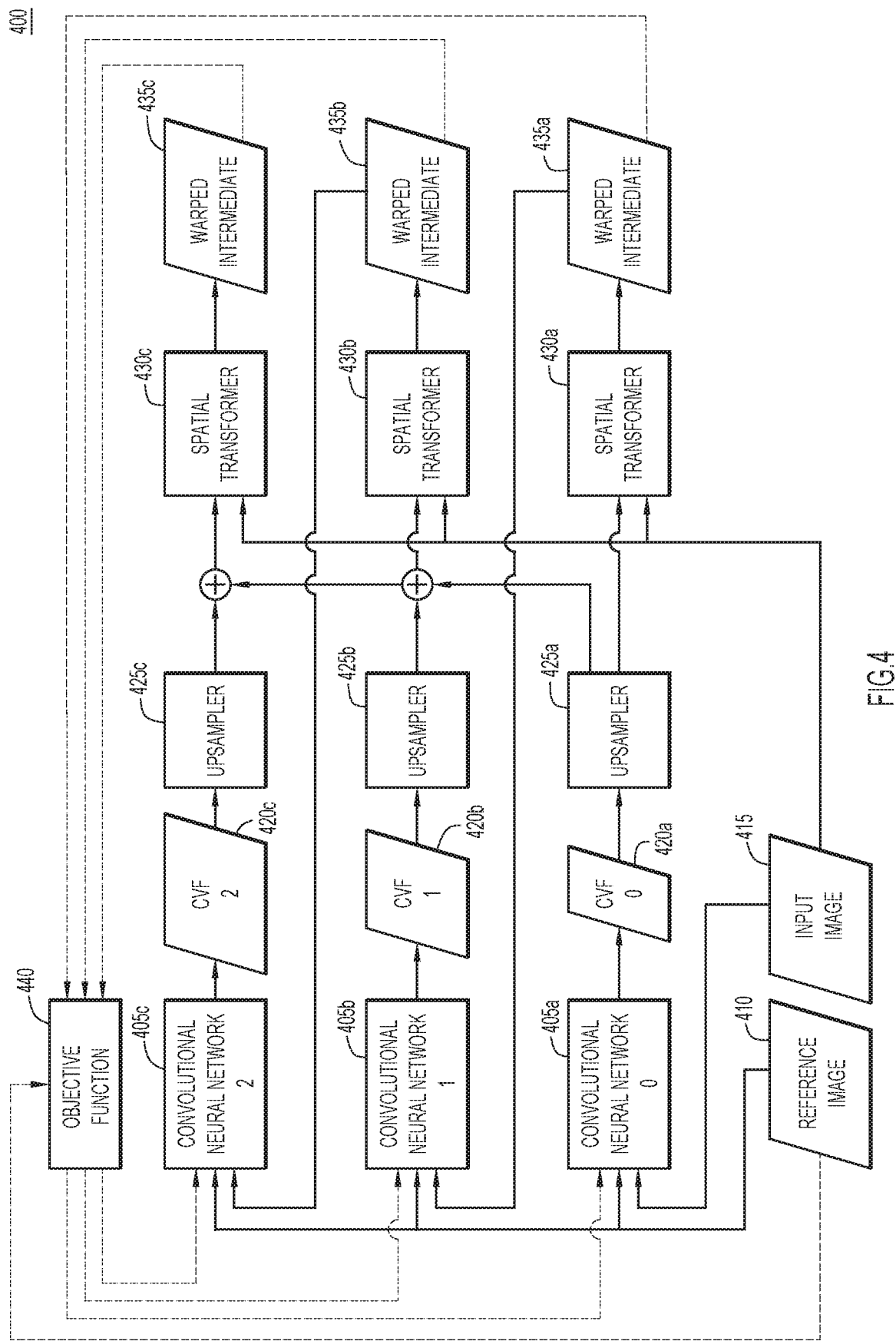
FIG. 4 illustrates a second process flow for training and using neural networks according to the image registration techniques of the present disclosure, according to example embodiments.
Figure 5:
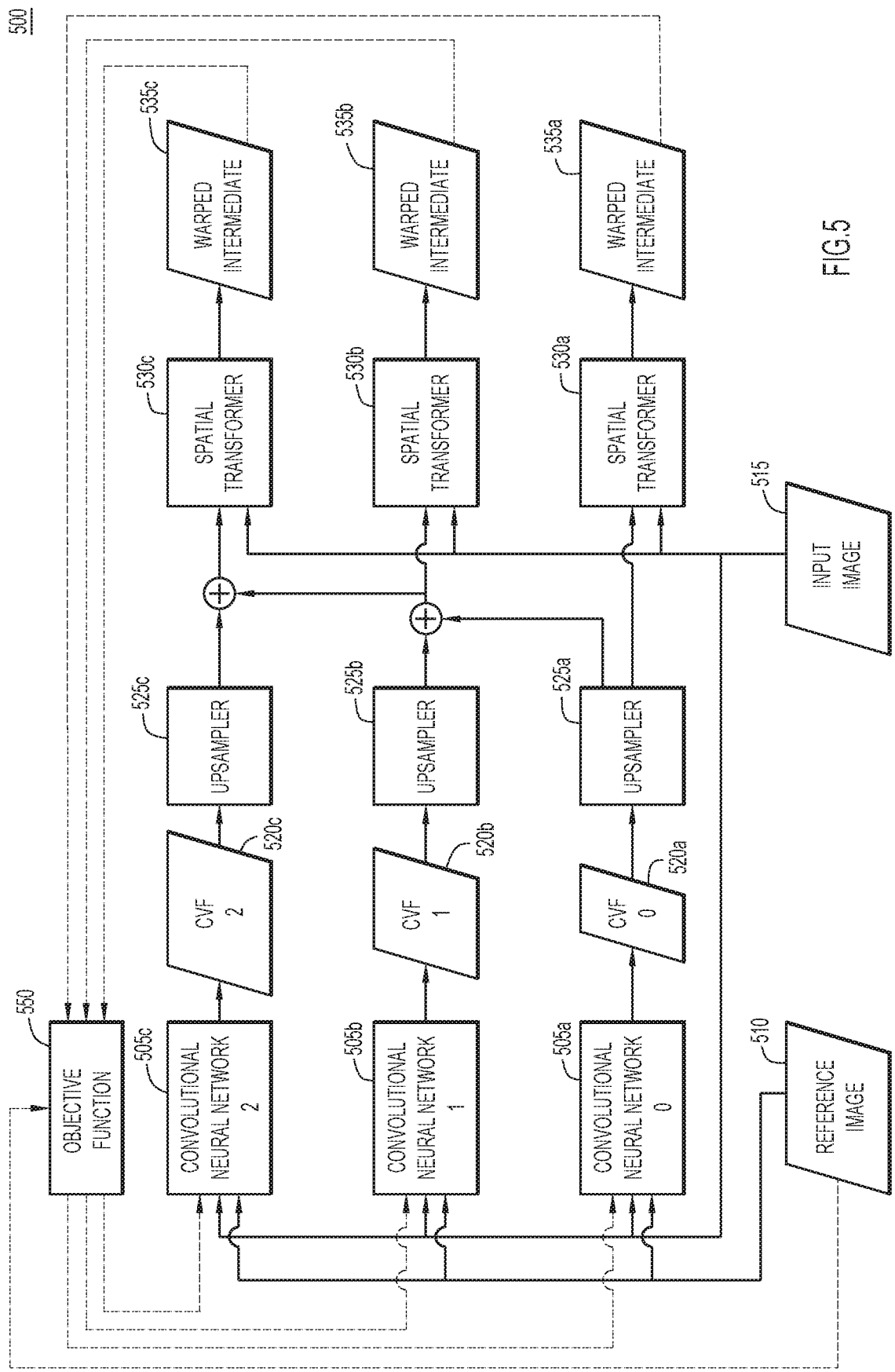
FIG. 5 illustrates a third process flow for training and using neural networks according to the image registration techniques of the present disclosure, according to example embodiments.

With reference now made to FIG. 4, depicted therein is process flow 400 for training neural networks to register images according to the hierarchical techniques of the present disclosure. Like FIG. 3, FIG. 4 includes a reference image 410, one or more input images 415, two or more CNNs 405a-c, coarse vector fields 420a-c, upsamplers 425a-c, spatial transformers 430a-c, and objective function 440. Like FIG. 3, FIG. 4 is illustrated and will be described with a plurality of CNNs 405a-c. As noted above, the processing provided by CNNs 405a-c may be implemented through a greater or fewer number of CNNs. Similarly, FIG. 4 is illustrated and described below with reference to three upsamplers 425a-c and three spatial transformers 435a-c. Other example embodiments may separate or combine the processing provided by these elements into more or fewer upsamplers and/or spatial transformers, respectively. Additionally, objective function 440 is illustrated as evaluating each of CNNs 405a-c. According to other example embodiments, more or fewer objective functions may be used to evaluate CNNs 405a-c. For example, a separate objective function may be used to evaluate each of CNNs 405a-c, respectively.

As with FIG. 3, the coarse vector fields 410a-c are applied to image data to generate warped images 435a-c which are used by objective function 440 to evaluate the registration provided by coarse vector fields 410a-c. CNNs 405a-c are then updated to generate improved vector fields based upon the output of objective function 440.

Process flow 400 differs from that of FIG. 3 in that the image data inputs to spatial transformers 430b and 430c are connected to the input image 415 directly instead of warped images 435a-b. In other words, the image data provided to spatial transformers 430a-c is data directly associated with input image 415. Like process flow 300 of FIG. 3, process flow 400 begins with reference image 410 and one or more input images 415 being provided to CNN 405a. CNN 405a generates coarse vector field 420a, which is upsampled by upsampler 425a to generate an upsampled vector field. The upsampled vector field is provided to spatial transformer 430a where the upsampled vector field is used to warp the one or more input images 415 to form warped images 435a. Process flow 400 deviates from process flow 300 in the processing performed through CNN 405b and spatial transformer 430b. Specifically, coarse vector field 420b is upsampled by upsampler 425b, and the output is combined with the output of upsampler 425a. This combined upsampled vector field is then provided to spatial transformer 430b where the combined upsampled vector field is applied not to warped images 435a, but to input images 415. In this manner, the warped image 435b is generated using a single interpolation of the input image 415, thereby improving the fidelity of warped image 435b.

Similarly, coarse vector field 420c is generated by CNN 405c based upon reference image 410 and warped image 435b. Coarse vector field 420c is then upsampled by upsampler 425c, the output of which is combined with the combination of the output of upsampler 425a and upsampler 425b. This combined upsampled vector field is then provided to spatial transformer 430c where the combined upsampled vector field is applied not to warped images 435c, but to input images 415.

As with process flow 300 of FIG. 3, warped images 435a-c are provided to objective function 440, as is reference image 410. The output of objective function 440 is used to improve CNNs 405a-c, and the training illustrated in process flow 400 is repeated until objective function 440 determines that a comparison of reference image 410 and warped images 435a-c has reached a sufficient level of accuracy.

With reference now made to FIG. 5, depicted therein is another process flow 500 according to the techniques of the present disclosure. Like process flows 300 and 400 of FIGS. 3 and 4, respectively, process flow 500 provides for training neural networks to register images according to the hierarchical techniques of the present disclosure using a reference image 510, one or more input images 515, a plurality of CNNs 505a-c, and an objective function 540. Like FIGS. 3 and 4, FIG. 5 is illustrated and will be described with a plurality of CNNs 505a-c. As noted above, the processing provided by CNNs 505a-c may be implemented through a greater or fewer number of CNNs. Similarly, FIG. 5 is illustrated and described below with reference to three upsamplers 525a-c and three spatial transformers 535a-c. Other example embodiments may separate or combine the processing provided by these elements into more or fewer upsamplers and/or spatial transformers, respectively. Additionally, objective function 540 is illustrated as evaluating each of CNNs 505a-c. According to other example embodiments, more or fewer objective functions may be used to evaluate CNNs 505a-c. For example, a separate objective function may be used to evaluate each of CNNs 505a-c, respectively.

Process flow 500 is similar to the of process flow 400 of FIG. 4, but differs in that warped images 535a and 535b do not serve as inputs to CNNs 505b and 505c. Instead, the inputs to each of CNNs 505a-c are the reference image 510 and the input image or images 515.

Once the training process flows 300, 400 and 500 of FIGS. 3, 4 and 5, respectively, have completed, the CNNs 305a-c, 405a-c and 505a-c may be used to register images. The registration process flows will follow the training process flows, but the process steps performed by objective functions 340, 440 and 540 are omitted, and warped images 335c, 445c and 545c, respectively, will serve as the registered version of an input image.

For example, returning to FIG. 3, each of the input images 315 serve as the input to CNN 305a. Reference image 310 is provided to each of CNNs 305a-c. CNN 305a generates coarse vector field 320a, which is upsampled by upsampler 325a. Spatial transformer 330a receives the upsampled vector field and applies it to a respective one of input images 315 to generate warped image 335a. Warped image 335a serves as an input to CNN 305b, which generates coarse vector field 320b. Upsampler 325b upsamples coarse vector field 320b and provides the upsampled vector field to spatial transformer 330b. Spatial transformer 330b applies the upsampled vector field to warped image 335a, to generate warped image 335b. Warped image 335b serves as an input to CNN 305c, which generates coarse vector field 320c. Upsampler 325c upsamples coarse vector field 320c and provides the upsampled vector field to spatial transformer 330c. Spatial transformer 330c applies the upsampled vector field to warped image 335b, to generate warped image 335c. Warped image 335c is the registered version of the input image 315. This process repeats for each input image 315 in the group of images to be registered. As with the training process, the registration process of FIG. 3 may be carried out with more or fewer CNNs, upsamplers and spatial transformers than the three illustrated in FIG. 3.

Returning to FIG. 4, images to be registered are input to CNN 405a as an input image 415. Reference image 410 is provided to each of CNNs 405a-c. CNN 405a generates coarse vector field 420a, which is upsampled by upsampler 425a. Spatial transformer 430a receives the upsampled vector field and applies it to the respective one of input images 415 to generate warped image 435a. Warped image 435a serves as an input to CNN 405b, which generates coarse vector field 420b. Upsampler 425b upsamples coarse vector field 420b, which is combined with the upsampled vector field output from upsampler 425a. This combined vector field is provided to spatial transformer 430b which warps input image 415 to generated warped image 435b. Warped image 435b serves as an input to CNN 405c, which generates coarse vector field 420c. Upsampler 425c upsamples coarse vector field 420c, which is combined with the combined vector field previously provided to spatial transformer 430b. This combined vector field is provided to spatial transformer 430c which warps input image 415 to generated warped image 435c, which serves as the registered version of the input image 415. This process repeats for each input image 415 in the group of images to be registered. As with the training process, the registration process of FIG. 4 may be carried out with more or fewer CNNs, upsamplers and spatial transformers than the three illustrated in FIG. 4.

Returning to FIG. 5, the processing depicted therein may provide for registered images, but during the registration processing there would be no need to generate warped images 535a and 535b, as these images do not serve as inputs to any of CNNs 505a-c or spatial transformers 530a-c. Accordingly, registering images after training as illustrated in FIG. 5 would proceed as follows. An image to be registered, or an input image 515 would be provided to each of CNNs 505a-c, as would the reference image 510. CNNs 505a-c would generate coarse vector fields 520a-c, respectively, each of which would be upsampled by upsamplers 525a-c, respectively. The outputs of upsamplers 515a-c would be combined and provided to a spatial transformer, in this case, spatial transformer 530c. Spatial transformer 530c would apply the combined vector field to the input image 515, resulting in warped image 535c, which would serve as the registered version of the input image 515. This process would repeat for each image to be registered. As indicated through the process described above, intermediate warped images 535a and 535b need not be generated as they do not serve as an input to any one of CNNs 505a-c or the spatial transformer which applies the combined vector field to the input image. As with the training process, the registration process of FIG. 5 may be carried out with more or fewer CNNs, upsamplers and spatial transformers than the three illustrated in FIG. 5.

Figure 6:
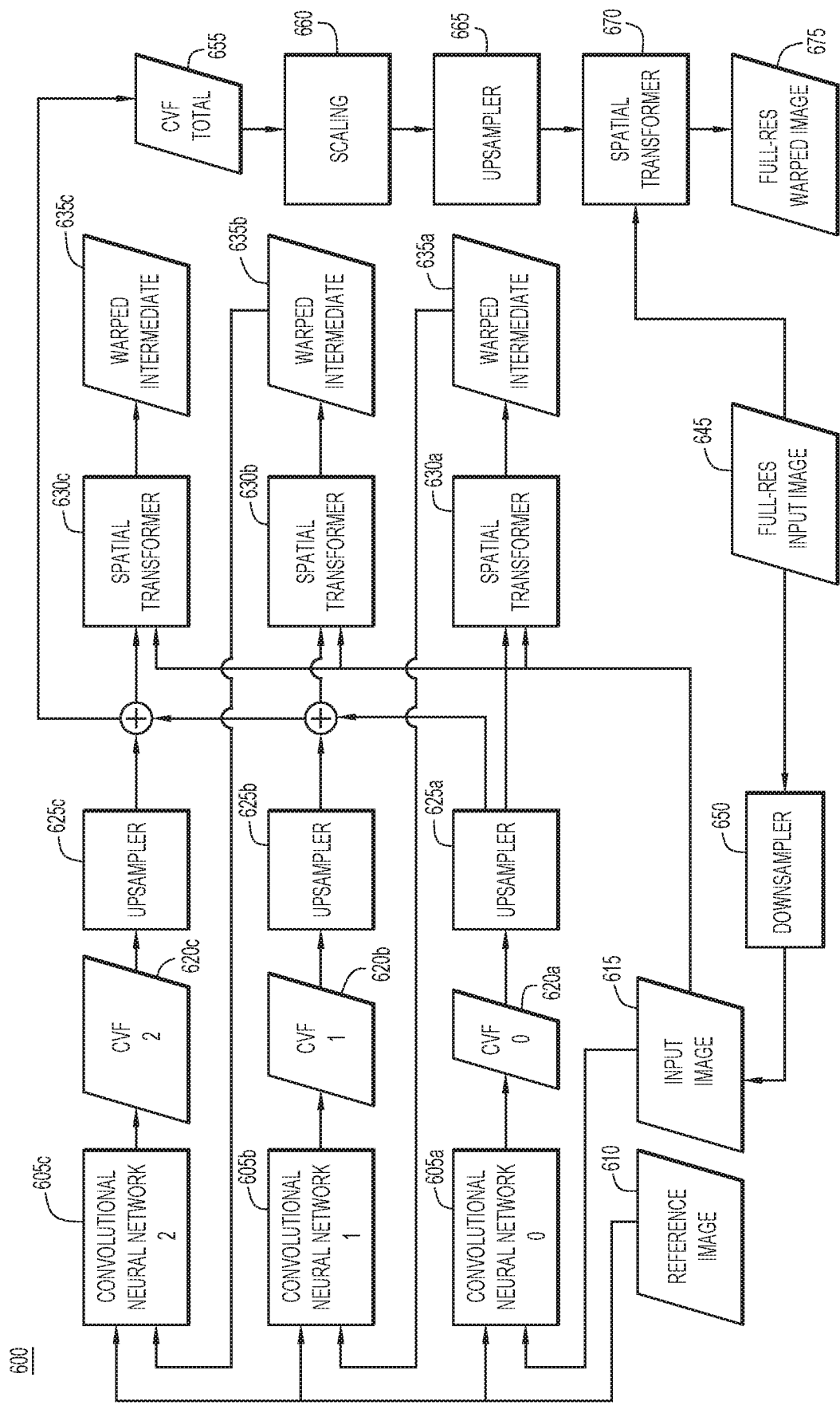
FIG. 6 illustrates a process flow for using neural networks to provide image registration of high resolution images according to the image registration techniques of the present disclosure, according to example embodiments.

With reference now made to FIG. 6, depicted therein is an example of the process flow 600 used to register a plurality of high resolution images after the training of neural networks using low resolution versions of the high resolution images. Such a process may allow for a more efficient or less time consuming training process, and provide for registration of high resolution images without requiring large amounts of computer memory. The processing of FIG. 6 is essentially the processing of FIG. 4 without the inclusion of the objective function, and without the repetition of the processing that results in improvement of the CNNs, which is unnecessary as the CNNs 605a-c have already been trained by process flow 400 of FIG. 4. While the processing of FIG. 6 is analogous to that of FIG. 4, it adds additional processing elements to deal with high resolution images to register, as described in detail below. FIG. 6 assumes that CNNs 605a-c have been trained using low resolution versions of full resolution input images 645. For example, input images 415 of FIG. 4 may be generated from full resolution input images 645 via downsampler 650.

Process flow 600 begins with the downsampling of full resolution input images 645 via downsampler 650 to generate input images 615. Input images 615 are input to CNN 605a as is reference image 610, which may also be a downsampled one of full resolution input images 645. CNN 605a generates coarse vector field 620a, which is upsampled by upsampler 625a. Spatial transformer 630a receives the upsampled vector field and applies it to the respective one of input images 615 to generate warped image 635a. Warped image 635a serves as an input to CNN 605b, which generates coarse vector field 620b. Upsampler 625b upsamples coarse vector field 620b, which is combined with the upsampled vector field output from upsampler 625a. This combined vector field is provided to spatial transformer 630b which warps input image 615 to generated warped image 635b. Warped image 635b serves as an input to CNN 605c, which generates coarse vector field 620c. Upsampler 625c upsamples coarse vector field 620c, which is combined with the combined vector field previously provided to spatial transformer 630b to generate vector field 655. Vector field 655 is scaled using scaler 660 to correspond to the resolution of full resolution input images 645. The scaled version of vector field 655 is provided to upsampler 665. The output of upsampler 665 is provided to spatial transformer 670, as is the respective full resolution input images 645. Spatial transformer 670 applies the scaled and upsampled version of vector field 655 to the full resolution input image 645 to generate full resolution warped image 675, the registered version of the respective full resolution input image 645. While spatial transformer 630c and warped images 635c are illustrated in FIG. 6, they are unnecessary to the registration processing as they are not used to generate inputs that are used in the generation of full resolution warped image 675.

Process flows 300 and 500 of FIGS. 3 and 5 may be modified to process high resolution images in ways analogous to those made to process flow 400 of FIG. 4 to form process flow 600 of FIG. 6. Additionally, the registration process of FIG. 6 may be carried out with more or fewer CNNs, upsamplers and spatial transformers than the three illustrated in FIG. 6.

With reference now made to FIG. 7, depicted therein is a flowchart 700 illustrating a process flow for carrying out the training of and registering of images by one or more neural networks according to the hierarchical image registration techniques of the present disclosure. Specifically, process flow 700 may correspond to one or more of process flows 300, 400, 500 and/or 600 of FIGS. 3, 4, 5 and/or 6, respectively.

The process of flowchart 700 begins in operation 705 where one or more neural networks generate a first vector field from a reference image and first image data of an input image. For example, operation 705 may include the generation of vectors fields by CNNs 305a or 305b of FIG. 3, CNNs 405a or 405b of FIG. 4 and/or CNNs 505a or 505b of FIG. 5. According to the example of FIG. 3, the first image data may correspond to input image 315 as used in the generation of vector field 320a or to warped image 335a as used in the generation of vector field 320b. According to the example of FIG. 4, the first image data may correspond to input image 415 as used in the generation of vector field 420a or to warped image 435a as used in the generation of vector field 320b. According to the example of FIG. 5, the first image data may correspond to input image 515 as used in the generation of vector field 520a or to input image 515 as used in the generation of vector field 520b.

In operation 710, the first vector field is applied to second image data of the input image to generate a first warped image of the input image. Operation 710 may include, for example, the application of vector fields to image data by spatial transformers 330a or 330b of FIG. 3, spatial transformers 430a or 430b of FIG. 4 and/or spatial transformers 530a or 530b of FIG. 5. According to the example of FIG. 3, the second image data may correspond to input image 315 applied to spatial transformer 330a or warped image 335a applied to spatial transformer 330b. According to the example of FIG. 4, the second image data may correspond to input image 415 applied to spatial transformer 430a or input image 415 applied to spatial transformer 430b. According to the example of FIG. 5, the second image data may correspond to input image 515 applied to spatial transformer 530a or input image 515 applied to spatial transformer 530b.

In operation 715, the training of the one or more neural networks is evaluated via an objective function, the reference image and the first warped image. For example, operation 715 may include the evaluation provided by objective function 340 of FIG. 3, objective function 440 of FIG. 4 and/or objective function 540 of FIG. 5.

In operation 720, the one or more neural networks are updated in response to the evaluation by the objective function, the reference image and the first warped image. For example, operation 720 may include the updating of one or more of CNNs 305a and 305b by objective function 340 of FIG. 3, the updating of one or more of CNNs 405a and 405b by objective function 440 of FIG. 4 and/or the updating of one or more of CNNs 505a and 505b by objective function 540 of FIG. 5.

In operation 725, the one or more neural networks generates a second vector field from the reference image and third image data of the input image. A number of degrees of freedom in the first vector field is less than a number of degrees of freedom in the second vector field. For example, operation 720 may include the generation of vectors fields by CNNs 305b or 305c of FIG. 3, CNNs 405b or 405c of FIG. 4 and/or CNNs 505b or 505c of FIG. 5. According to the example of FIG. 3, the third image data may correspond to warped image 335a as used in the generation of vector field 320b or to warped image 335b as used in the generation of vector field 320c. According to the example of FIG. 4, the third image data may correspond to warped image 435a as used in the generation of vector field 420b or to warped image 435b as used in the generation of vector field 420c. According to the example of FIG. 5, the third image data may correspond to input image 515 as used in the generation of vector field 520b or to input image 515 as used in the generation of vector field 520c.

In operation 730, the second vector field is applied to fourth image data of the input image to generate a second warped image of the input image. Operation 730 may include, for example, the application of vector fields to image data by spatial transformers 330b or 330c of FIG. 3, spatial transformers 430b or 430c of FIG. 4 and/or spatial transformers 530b or 530c of FIG. 5. According to the example of FIG. 3, the fourth image data may correspond to warped image 335a applied to spatial transformer 330b or warped image 335b applied to spatial transformer 330c. According to the example of FIG. 4, the fourth image data may correspond to input image 415 applied to spatial transformer 430b or input image 415 applied to spatial transformer 430c. According to the example of FIG. 5, the fourth image data may correspond to input image 515 applied to spatial transformer 530b or input image 515 applied to spatial transformer 530c.

In operation 735, the training of the one or more neural networks is evaluated via the objective function, the reference image and the second warped image. For example, operation 735 may include the evaluation provided by objective function 340 of FIG. 3, objective function 440 of FIG. 4 and/or objective function 540 of FIG. 5.

In operation 740, the one or more neural networks are updated in response to the evaluation by the objective function, the reference image and the second warped image. For example, operation 740 may include the updating of one or more of CNNs 305b and 305c by objective function 340 of FIG. 3, the updating of one or more of CNNs 405b and 405c by objective function 440 of FIG. 4 and/or the updating of one or more of CNNs 505b and 505c by objective function 540 of FIG. 5.

The process of flowchart 700 may include more or fewer steps without deviating from the techniques of the present application. For example, additional layers may be added to a process flow like that of flowchart 700. Similarly, the process flow of flowchart 700 may be repeated for a plurality of images until the evaluation provided by the objective function reaches a sufficient level. The process flow of flowchart 700 may also include the registration processes described above with regard to FIGS. 3, 4, 5 and/or 6. According to other example embodiments, the registration process may take place as a separate process.

Figure 8:
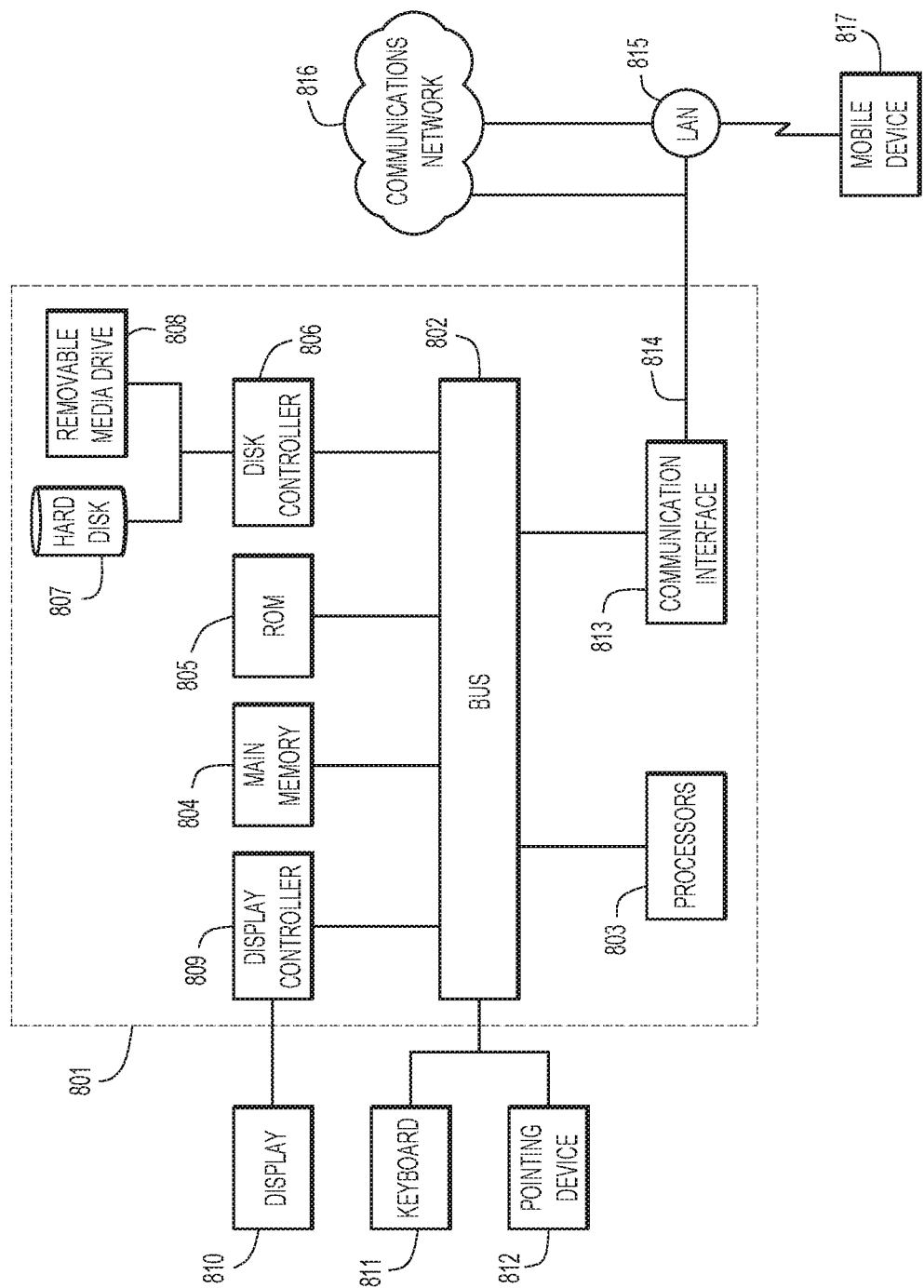
FIG. 8 is a block diagram of an apparatus configured to implement the image registration techniques of the present disclosure, according to example embodiments.

With reference now made to FIG. 8, depicted therein is an apparatus configured to implement the techniques of the present disclosure. Specifically, illustrated in FIG. 8 is an apparatus that may be configured to implement hierarchical image registration techniques as described above with reference to FIGS. 1-7. FIG. 8 illustrates a computer system 801 upon which the embodiments presented may be implemented. The computer system 801 may be programmed to implement a computer based device. The computer system 801 includes a bus 802 or other communication mechanism for communicating information, and a processor 803 coupled with the bus 802 for processing the information. While the figure shows a single block 803 for a processor, it should be understood that the processors 803 represent a plurality of processing cores, each of which can perform separate processing. The computer system 801 also includes a main memory 804, such as a random access memory (RAM) or other dynamic storage device (e.g., dynamic RAM (DRAM), static RAM (SRAM), and synchronous DRAM (SD RAM)), coupled to the bus 802 for storing information and instructions to be executed by processor 803. In addition, the main memory 804 may be used for storing temporary variables or other intermediate information during the execution of instructions by the processor 803.

The computer system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The computer system 801 also includes a disk controller 806 coupled to the bus 802 to control one or more storage devices for storing information and instructions, such as a magnetic hard disk 807 or solid state drive, and a removable media drive 808 (e.g., floppy disk drive, read-only compact disc drive, read/write compact disc drive, removable magneto-optical drive and optical storage drive). The storage devices may be added to the computer system 801 using an appropriate device interface (e.g., small computer system interface (SCSI), integrated device electronics (IDE), enhanced-IDE (E-IDE), direct memory access (DMA), or ultra-DMA), or any other technologies now known or hereinafter developed.

The computer system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 801 may also include a display controller 809 coupled to the bus 802 to control a display 810, such as a Liquid Crystal Display (LCD), Light Emitting Diode (LED) display, or other now known or hereinafter developed display technologies, for displaying information to a computer user. The computer system 801 includes input devices, such as a keyboard 811 and a pointing device 812, for interacting with a computer user and providing information to the processor 803. The pointing device 812, for example, may be a mouse, a trackball, a pointing stick or a touch-pad, for communicating direction information and command selections to the processor 803 and for controlling cursor movement on the display 810. The display 810 may be a touch-screen display.

The computer system 801 performs a portion or all of the processing steps of the process in response to the processor 803 executing one or more sequences of one or more instructions contained in a memory, such as the main memory 804. Such instructions may be read into the main memory 804 from another computer readable medium, such as a hard disk or solid state drive 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the computer system 801 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 801, for driving a device or devices for implementing the process, and for enabling the computer system 801 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 801 also includes a communication interface 813 coupled to the bus 802. The communication interface 813 provides a two-way data communication coupling to a network link 814 that is connected to, for example, a local area network (LAN) 815, or to another communications network 816 such as the Internet. For example, the communication interface 813 may be a wired or wireless network interface card to attach to any packet switched (wired or wireless) LAN. As another example, the communication interface 813 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 813 sends and receives electrical, electromagnetic or optical signals that carry digital data streams representing various types of information.

The network link 814 typically provides data communication through one or more networks to other data devices. For example, the network link 814 may provide a connection to another computer through a local area network 815 (e.g., a LAN) or through equipment operated by a service provider, which provides communication services through a communications network 816. The local network 814 and the communications network 816 use, for example, electrical, electromagnetic, or optical signals that carry digital data streams, and the associated physical layer (e.g., CAT 5 cable, coaxial cable, optical fiber, etc.). The signals through the various networks and the signals on the network link 814 and through the communication interface 813, which carry the digital data to and from the computer system 801 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 801 can transmit and receive data, including program code, through the network(s) 815 and 816, the network link 814 and the communication interface 813. Moreover, the network link 814 may provide a connection through a LAN 815 to a mobile device 817 such as a personal digital assistant (PDA) laptop computer, or cellular telephone.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, provided for by example embodiments of the techniques of the present application are deep convolutional neural network training and utilization techniques that provide a solution for the stabilization and registration of image sets, such as full-motion video image data. The techniques and architectures described above use a pyramid structure designed such that each layer of the pyramid learns to correct for a hierarchy of motion in the source imagery. According to specific example embodiments, the coarsest layer of the network learns to correct the translational offset between a source and reference image pair, and subsequent layers with progressively more degrees of freedom learn to correct for perspective transformations and higher order distortions such as lens distortion and parallax. A key aspect of example embodiments of the network architecture used in the training process is the connection of the output of each level to the objective function, which encourages each level of the network to learn the optimal set of parameters that minimize the difference between the warped and reference images given the degrees of freedom available in that layer. Another important aspect of the network architecture of example embodiments is the connection of the output of the previous layer to the input of the subsequent layer. This encourages each level of the network to learn only the corrections that could not be described by previous layers. By providing vector fields at coarse resolutions, example embodiments provide spatial smoothness to the deformable warp, significantly alleviating the ambiguity in uniform image regions. The techniques of the present disclosure provide stabilization results that show robustness across sensor types and modalities.

The techniques of the present disclosure may be applied to image registration without regard to the type of image information (i.e., visible-wavelength image data, infrared image data, radar image data, x-ray image data, nuclear magnetic resonance image data, computed tomography image data, etc.). Furthermore, the techniques of the present disclosure may be used to register image data from one or more different modalities. For example, visible wavelength images may be registered with infrared wavelength images according to the techniques of the present disclosure. X-ray image data may be registered with nuclear magnetic resonance image data. In other words, the techniques of the present disclosure are "agnostic" regarding the manner in which the image data being registered was acquired.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   generating, via one or more neural networks from a reference image and first image data of an input image, a first vector field;
   applying the first vector field to second image data of the input image to generate a first warped image of the input image;
   evaluating the training of the one or more neural networks via one or more objective functions, the reference image and the first warped image;
   updating the one or more neural networks in response to the evaluating via the one or more objective functions, the reference image and the first warped image;
   generating, via the one or more neural networks from the reference image and third image data of the input image, a second vector field, wherein a number of degrees of freedom in the first vector field is less than a number of degrees of freedom in the second vector field;
   applying the second vector field to fourth image data of the input image to generate a second warped image of the input image;
   evaluating the one or more neural networks via the one or more objective functions, the reference image and the second warped image; and
   updating the one or more neural networks in response to the evaluating via the one or more objective functions, the reference image and the second warped image.

2. The method of claim 1, wherein generating the first vector field comprises generating the first vector field via a first neural network; and
   wherein generating the second vector field comprises generating the second vector field via a second neural network that is different from the first neural network.

3. The method of claim 1, wherein the first image data comprises the input image.

4. The method of claim 1, wherein the second image data comprises the input image.

5. The method of claim 1, wherein the third image data comprises the first warped image.

6. The method of claim 1, wherein the third image data comprises the first image data.

7. The method of claim 1, wherein the fourth image data comprises the first image data.

8. The method of claim 1, wherein the fourth image data comprises the first warped image.

9. The method of claim 1, wherein applying the second vector field to the fourth image data comprises:
   summing the first vector field with the second vector field to generate a combined vector field; and
   applying the combined vector field to the fourth image data.

10. The method of claim 1, further comprising upsampling the first vector field to generate an upsampled first vector field, and wherein applying the first vector field to the second image data comprises applying the upsampled first vector field to the second image data.

11. The method of claim 1, further comprising repeating the operations of claim 1 for one or more additional input images.

12. The method of claim 1, further comprising:
    generating, via the one or more neural networks from the reference image and fifth image data of the input image, a third vector field, wherein the number of degrees of freedom in the second vector field is less than a number of degrees of freedom in the third vector field;
    applying the third vector field to sixth image data of the input image to generate a third warped image; and
    evaluating the one or more neural networks via the one or more objective functions, the reference image and the third warped image.

13. The method of claim 12, wherein the number of degrees of freedom in the first vector field is two;
    wherein the number of degrees of freedom in the second vector field is eight; and
    wherein the number of degrees of freedom in the third vector field is thirty two.

14. The method of claim 1, further comprising registering a plurality of images using the one or more neural networks.

15. An apparatus comprising:
    a memory figured to store image data; and
    a processor, wherein the processor is configured to:
       generate, via one or more neural networks from a reference image and first image data of an input image, a first vector field;
       apply the first vector field to second image data of the input image to generate a first warped image of the input image;
       evaluate the training of the one or more neural networks via one or more objective functions, the reference image and the first warped image;
       update the one or more neural networks in response to the evaluating via the one or more objective functions, the reference image and the first warped image;
       generate, via the one or more neural networks from the reference image and third image data of the input image, a second vector field, wherein a number of degrees of freedom in the first vector field is less than a number of degrees of freedom in the second vector field;
       apply the second vector field to fourth image data of the input image to generate a second warped image of the input image;
       evaluate the one or more neural networks via the one or more objective functions, the reference image and the second warped image; and
       update the one or more neural networks in response to the evaluating via the one or more objective functions, the reference image and the second warped image.

16. The apparatus of claim 15, wherein the processor is further configured to:
    generate the first vector field by generating the first vector field via a first neural network; and
    generate the second vector field by generating the second vector field via a second neural network that is different from the first neural network.

17. The apparatus of claim 15, wherein the processor is configured to register a plurality of images using the one or more neural networks.

18. One or more tangible, non-transitory computer readable media encoded with instructions, wherein the instructions, when executed by a processor, are operable to:
    generate, via one or more neural networks from a reference image and first image data of an input image, a first vector field;
    apply the first vector field to second image data of the input image to generate a first warped image of the input image;
    evaluate the training of the one or more neural networks via one or more objective functions, the reference image and the first warped image;

update the one or more neural networks in response to the evaluating via the one or more objective functions, the reference image and the first warped image;

generate, via the one or more neural networks from the reference image and third image data of the input image, a second vector field, wherein a number of degrees of freedom in the first vector field is less than a number of degrees of freedom in the second vector field;

apply the second vector field to fourth image data of the input image to generate a second warped image of the input image;

evaluate the one or more neural networks via the one or more objective functions, the reference image and the second warped image; and update the one or more neural networks in response to the evaluating via the one or more objective functions, the reference image and the second warped image.

19. The one or more tangible, non-transitory computer readable media of claim 18, wherein the instructions are further operable to:

generate the first vector field by generating the first vector field via a first neural network; and generate the second vector field by generating the second vector field via a second neural network that is different from the first neural network.

20. The one or more tangible, non-transitory computer readable media of claim 18, wherein the instructions are further operable to register a plurality of images using the one or more neural networks.

* * * * *